(12) United States Patent
Kuramochi et al.

(10) Patent No.: US 6,282,972 B2
(45) Date of Patent: Sep. 4, 2001

(54) BALL SCREW MECHANISM

(75) Inventors: Michihiro Kuramochi, New Haven, CT (US); Nobumitsu Takahashi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/015,402

(22) Filed: Jan. 29, 1998

(30) Foreign Application Priority Data

Jan. 29, 1997 (JP) .................................................. 9-028337
Nov. 21, 1997 (JP) .................................................. 9-336579

(51) Int. Cl.$^7$ .................................................. F16H 25/22
(52) U.S. Cl. ................................................ 74/459; 74/89.15
(58) Field of Search .................................. 74/459, 89.15, 74/424.8 R (56) References Cited

U.S. PATENT DOCUMENTS

| | | | | |
|---|---|---|---|---|
| 2,502,066 | * | 3/1950 | Tanner | 74/459 |
| 2,508,261 | * | 5/1950 | Hosler | 74/459 |
| 3,161,073 | * | 12/1964 | Deutsch et al. | 74/459 |
| 5,228,353 | * | 7/1993 | Katahira et al. | 74/89.15 |
| 5,467,662 | * | 11/1995 | Lange et al. | 74/459 |
| 5,492,030 | | 2/1996 | Benton et al. | 74/441 |
| 5,653,145 | * | 8/1997 | Kobayashi et al. | 74/459 |

FOREIGN PATENT DOCUMENTS

| | | | |
|---|---|---|---|
| 42 40 624 A1 | 7/1994 | (DE) . | |
| 496034-A1 | * 7/1992 | (EP) | 74/459 |
| 1-312262 | 12/1989 | (JP) . | |

* cited by examiner

*Primary Examiner*—David A. Bucci
*Assistant Examiner*—Colby Hansen
(74) *Attorney, Agent, or Firm*—Sughrue, Mion, Zinn, Macpeak & Seas, PLLC

(57) ABSTRACT

When balls 3 are discharged from a nut 102 in accordance with relative axial movement of the nut 102 and a screw shaft 1, in order to prevent the balls 3 from contacting with thread grooves 102*a* and 1*a* of the nut 102 and the screw shaft 1 at three points, a counterbore 102*c* is formed around the thread groove 102*a* of the nut 102 in the vicinity of a discharge port for the balls 3 in the nut 102. When the balls 3 are contacted with the thread grooves 102*a* and 1*a*, therefore, a four-point contact is always maintained. Consequently, reaction forces which are applied from the thread grooves 102*a* and 1*a* to the balls 3 balance with each other, whereby stable holding of the balls 3 is ensured.

7 Claims, 14 Drawing Sheets

BALL SCREW MECHANISM

BACKGROUND OF THE INVENTION

The invention relates to a ball screw mechanism comprising a screw shaft and a nut member.

Figure 1:
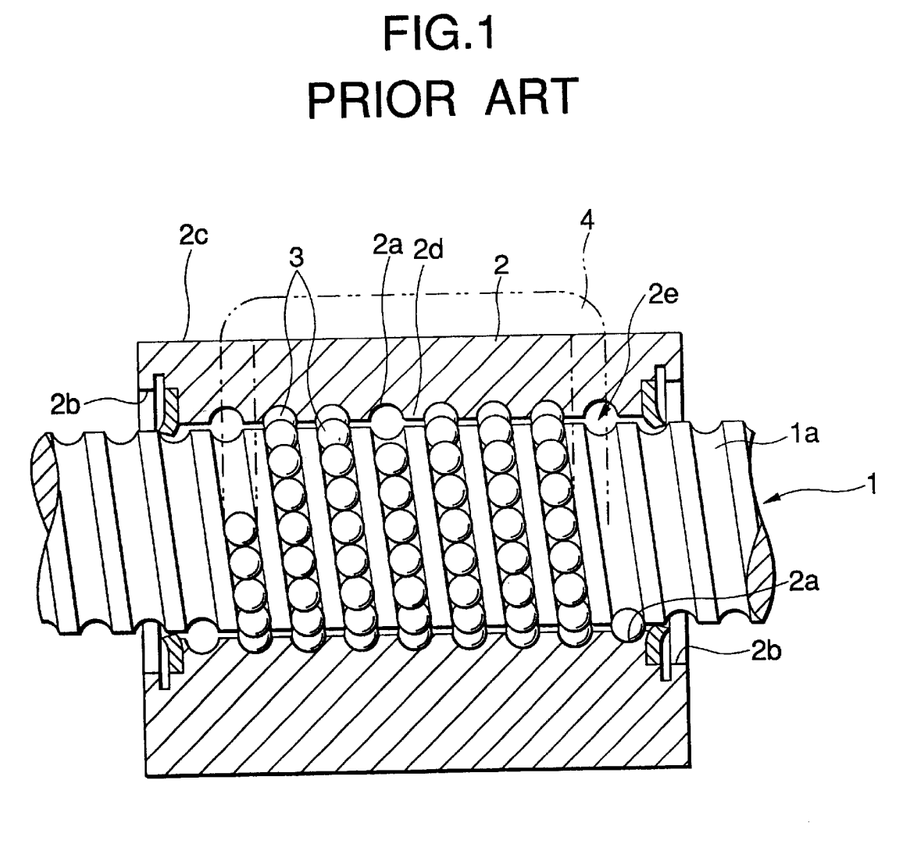
FIG. 1 is an axial section view of a circulation tube type ball screw mechanism of the prior art.

A ball screw mechanism is known as a mechanism which converts rotational motion to linear motion. As an example of such a ball screw mechanism, the whole configuration of a circulation tube type ball screw mechanism will be described with reference to FIG. 1. FIG. 1 is an axial section view of a ball screw mechanism. In the figure, a screw shaft 1 which is partly shown is a shaft member which has in the outer periphery a spiral groove (thread groove) 1a having a section shape similar to a Gothic arch as described later. A nut 2 serving as a nut member is a cylindrical member which has in the inner periphery 2e a spiral groove (thread groove) 2a corresponding to the spiral groove (thread groove) 1a of the screw shaft 1, and a spiral ridge 2d defined between the adjacent spiral grooves 2a. Although not illustrated, two through holes elongate from the upper face 2c of the nut 2 to the spiral groove (thread groove) 2a. Ends of a ball circulation tube 4 having a U-like shape as indicated by a phantom line are fittingly inserted into the through holes, respectively.

The screw shaft 1 is passed through the inside of the inner periphery 2e of the nut 2 so that the spiral groove (thread groove) 1a opposes to the spiral groove (thread groove) 2a of the nut. A number of balls 3 are rotatably housed in a trackway defined by the two opposed thread grooves.

When the nut 2 and the screw shaft 1 perform relative spiral movement, the balls 3 repeat circulation in which the balls rotatingly move along the trackway formed between by the spiral grooves (thread grooves) 1a and 2a, are scooped up from the trackway while being guided by a tongue portion (not shown) formed at one end of the ball circulation tube 4, to be directed into the ball circulation tube 4, pass through the tube, and then return to the trackway via the other end of the nut.

Figure 6:
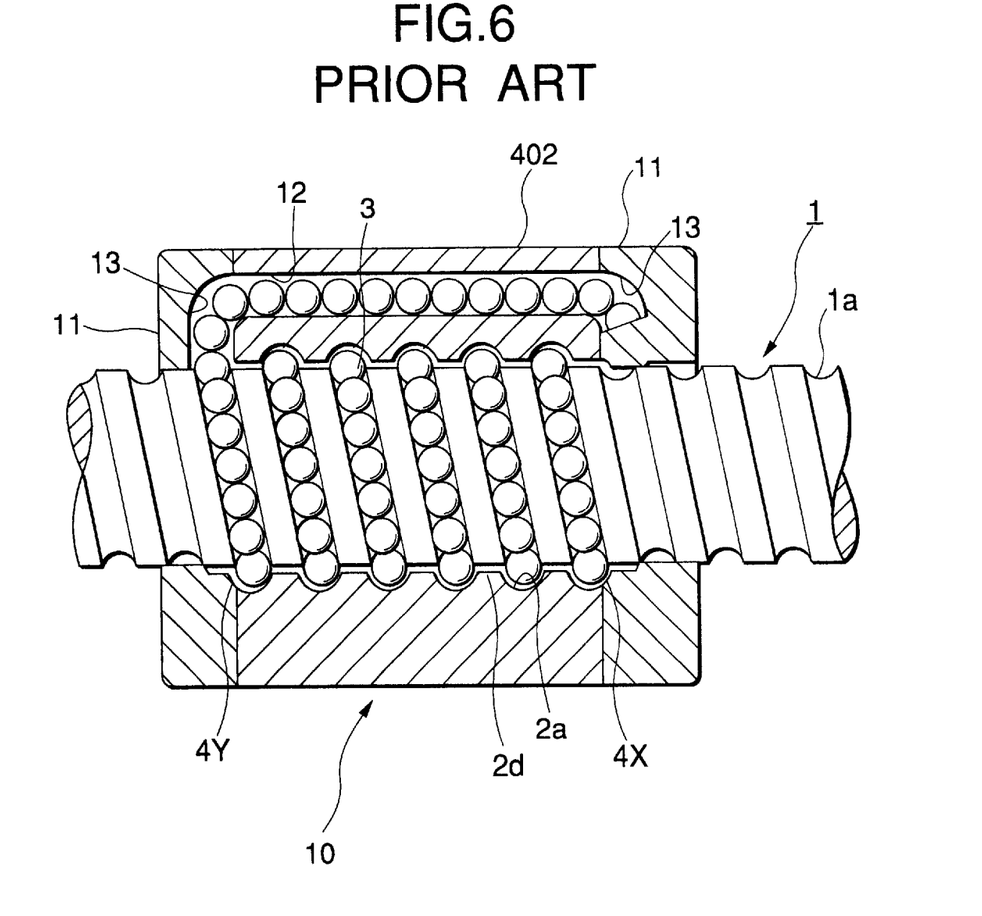
FIG. 6 is a longitudinal section view of an end cap type ball screw device of the prior art.

In addition to this, FIG. 6 shows an example of an end cap type ball screw device of the prior art. In the conventional example, a screw shaft 1 having a spiral groove (thread groove) 1a in the outer peripheral surface is threadedly engaged with a cylindrical ball screw nut 10 having in the inner peripheral surface a spiral groove (thread groove) 2a opposing to the spiral groove (thread groove) 1a of the screw shaft, via balls 3 which rotatingly move in the mutually opposing spiral grooves (thread grooves) 1a and 2a. The ball screw nut 10 comprises two kinds of members, i.e., a nut member 402, and disk-like ball circulation members (so called end caps) 11 which are detachably joined to the end faces of the nut member 402. A ball return passage 12 which consists of a through hole elongating in the axial direction is disposed in a thick portion of the nut member 402. In each of the end faces of the ball circulation member 11 where the member is joined to the nut member 402, disposed is a curved path 13 through which the spiral grooves (thread grooves) 1a and 2a communicate with the ball return passage 12.

When the screw shaft 1 and the ball screw nut 10 are relatively rotated, the balls 3 rotatingly advance in the two opposing screw grooves 1a and 2a of the screw shaft 1 and the ball screw nut 10 so as to repeat circulation in which the balls pass through the curved paths 13 disposed in the ball circulation members at the ends, and the ball return passage 12 disposed in the nut member 402, to return to the original position.

Since the balls which rotate in accordance with the rotation of the screw shaft move along the trackway, continuation of the relative spiral movement of the nut (or the nut member) and the screw shaft causes the balls to be discharged from the nut in due course of time. When the nut (or the nut member) is to be moved by a considerably long distance, therefore, any ball screw mechanism must be provided with a circulation unit such as a ball circulation tube which returns balls discharged from one end of the nut (or the nut member) to the other end of the nut. However, the provision of such a circulation unit produces a problem peculiar to a ball screw mechanism.

Figure 2:
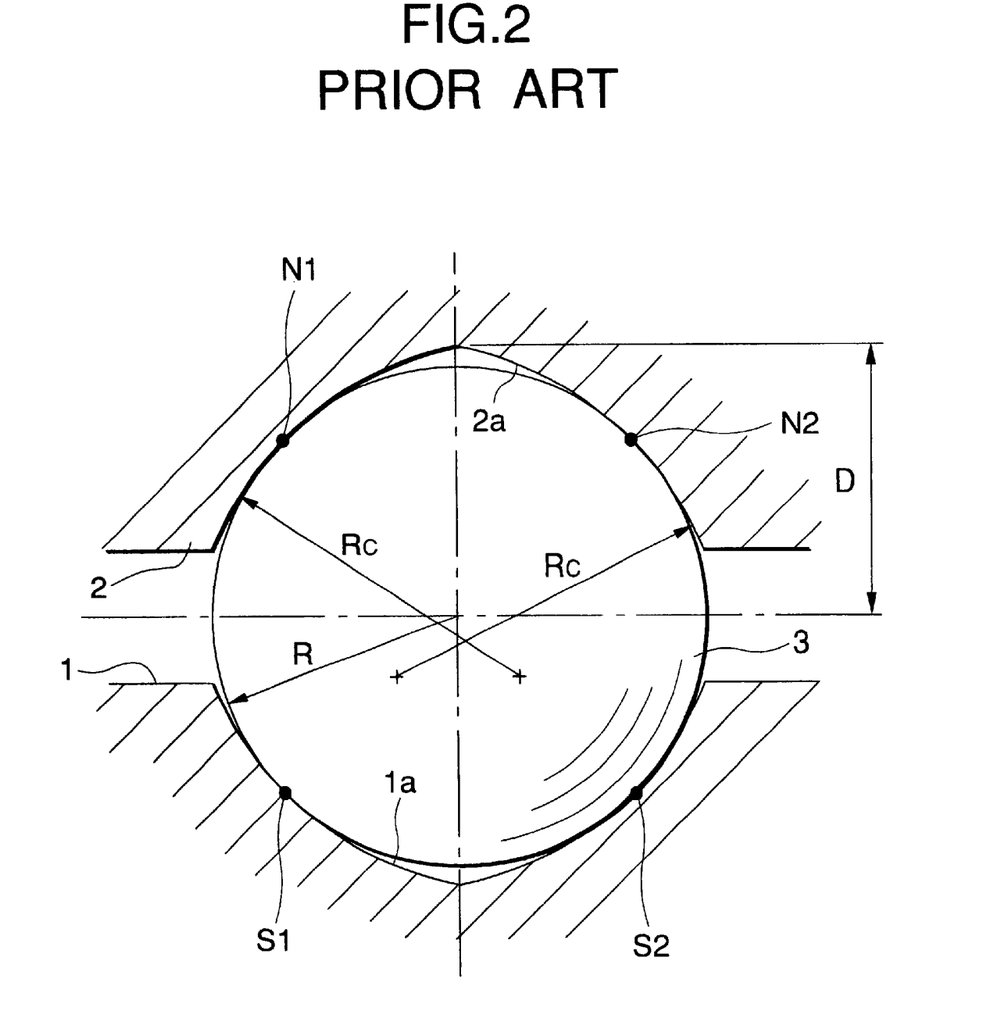
FIG. 2 is an enlarged section view showing the vicinity of a thread groove of the ball screw mechanism of FIG. 1, along a direction perpendicular to the thread groove.

Before the discussion of the problem, the relationship between balls and thread grooves is first described. FIG. 2 is an enlarged section view showing the vicinity of a thread groove of the ball screw mechanism of FIG. 1, along a direction perpendicular to the thread groove. Referring to the figure, a ball 3 is disposed between the thread groove 1a of the screw shaft 1 and the thread groove 2a of the nut 2.

As apparent from FIG. 2, the sections of the thread grooves 1a and 2a are not parts of a perfect circle, and have a shape which is a so-called Gothic arch and each of which is configured by combining two arcs (called flanks) with each other. Specifically, the sections of the thread grooves 1a and 2a constitute a shape in which arcs of a radius of curvature Rc are arranged in a laterally symmetrical manner. When the radius of the ball 3 is indicated by R, the relationship of Rc >R is held.

In view of the above-mentioned relationship between the radius R of the ball 3 and the radius of curvature Rc, the thread grooves 1a and 2a and the ball 3 are contacted with each other at four points, that is the points N1, N2, S1, and S2 in the FIG. 2. According to this configuration, a controlled pre-load can be easily applied to the balls, so that a back lash can be eliminated. When the pre-load is applied, the reaction forces produced at the four points balance with each other.

Hereinafter, the problem peculiar to a ball screw mechanism will be described with reference to the drawings.

Figure 3:
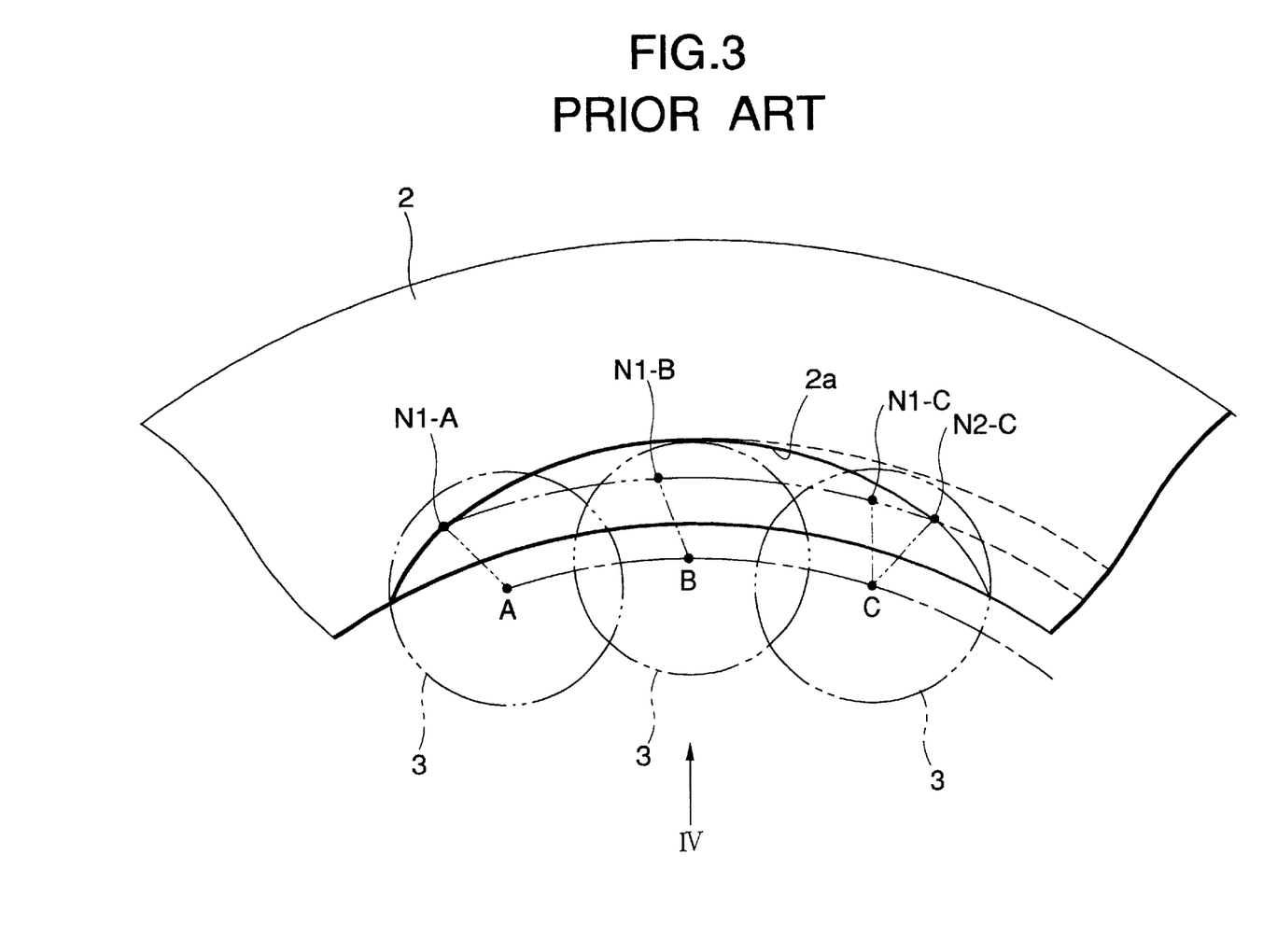
FIG. 3 is an enlarged view of an end portion of a nut 2 of an end cap type ball screw mechanism of the prior art, as seen in the axial direction.
Figure 4:
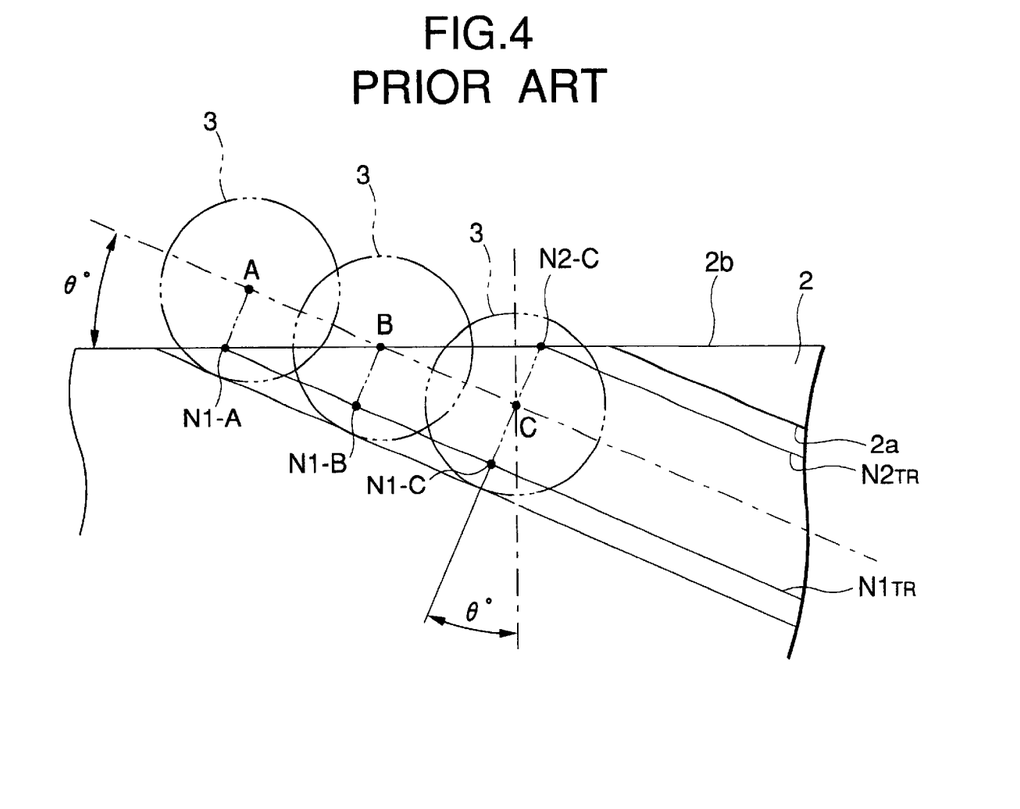
FIG. 4 is a view of the nut 2 of FIG. 3 as seen in the direction of the arrow IV.

FIG. 3 is an enlarged view of an end portion of the nut 2 of the end cap type ball screw mechanism as seen in the axial direction, and FIG. 4 is a view of the nut 2 of FIG. 3 as seen in the direction of the arrow IV. As apparent from comparison of FIG. 2 with FIGS. 3 and 4, since the thread groove 2a has a lead angle θ and the thread groove is cut by the end face 2b of the nut 2 which is perpendicular to the axis, the thread groove 2a has an opening shape which elongates in the peripheral direction.

In FIGS. 3 and 4, the ball 3 which rotates in the thread groove 2a is indicated by phantom lines. The relative spiral movement of the nut and the screw shaft (not shown) causes the ball 3 to rotate so that the center of the ball 3 moves in the sequence of the positions C, B, and A, and the ball is finally discharged from the nut 2. The line $N1_{TR}$ indicates the locus of the contact point N1 between the ball 3 and the thread groove 2a, and the line $N2_{TR}$ indicates the locus of the contact point N2 between the ball 3 and the thread groove 2a.

Until the center of the ball 3 reaches the position C, the ball is contacted with the thread groove 2a of the nut 2 at the two points, and also with the thread groove of the screw shaft (not shown) at two points. In other words, the contact relationship between the ball and the thread grooves is in the normal state shown in FIG. 2.

At the timing when the center of the ball 3 passes the position C, however, the line $N2_{TR}$ is interrupted at the point N2-C as shown in FIG. 4. By contrast, the line NLTR further elongates to continue to the point N1-A.

Figure 5:
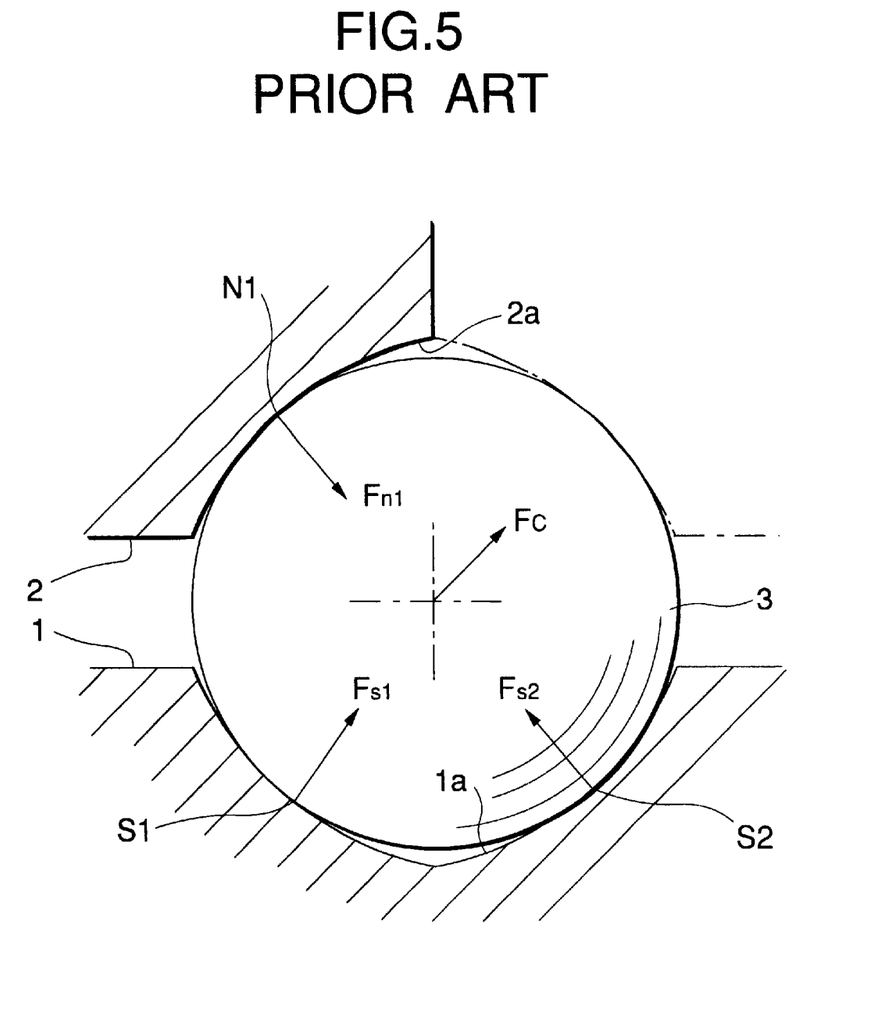
FIG. 5 is a section view similar to that of FIG. 2 and showing the state in which the center of a ball 3 is at the position B of FIG. 4.

FIG. 5 is a section view similar to that of FIG. 2 and showing the state in which the center of the ball 3 is at the position B of FIG. 4. As apparent from FIG. 5, the flank (arc) portion of the thread groove 2a which is in the upper and right side of the figure does not exist. The flank which exists in the normal state is shown by a phantom line. In other words, during a period when the center of the ball moves from the position C to the position A, the ball is contacted with the thread grooves 1a and 2a at three points.

In such a case, the reaction force Fn1 exerted between the ball 3 and the thread groove 2a of the nut 2 at the point N1 opposes to the reaction force Fs2 exerted between the ball 3 and the thread groove 1a of the screw shaft 1 at the point S2 to balance therewith. Because of the above-mentioned non-existence of the flank, however, no reaction force which opposes to the reaction force Fs1 exerted between the ball 3 and the thread groove 1a of the screw shaft 1 at the point S1 is produced. As a result, the ball 3 receives a force of FC (the force obtained by subtracting the friction force between the ball and the thread groove from the reaction force Fs1) in the direction of Fs1 at the point S1.

In order to eliminate backlash a pre-load is applied between the balls and the thread grooves, so that the force FC pushes the ball 3 in the direction of the force, thereby pushing the ball 3 to bite the grooves in the direction in which a flank does not exist. Even in the case where a pre-load is not applied, when a load is externally applied, a force similar to the force FC is produced so as to cause the ball 3 to bite the grooves.

During the period when the center of the ball 3 moves from the position C to the position A in FIG. 4, therefore, a state in which the ball 3 is easily bitten by the thread grooves 1a and 2a arises and a problem in that maloperation such as torque variations, jerk or jamming easily occurs in the operation of the ball screw mechanism.

SUMMARY OF THE INVENTION

In view of the problem, it is an object of the invention to provide a ball screw mechanism in which, although the configuration is simplified, the reliability is enhanced.

In order to attain the object, the ball screw mechanism of the invention comprises:

a screw shaft having a thread groove formed on its outer peripheral surface;

a nut member movable relative to the screw shaft in an axial direction thereof and having a thread groove which is formed on its inner peripheral surface and is opposed to the thread groove of the screw shaft;

a number of balls rotatingly movable along a trackway formed by the opposed thread grooves of the screw shaft and the nut member;

a ball returning member for returning the balls discharged from a discharge port of the trackway to an inlet port of the trackway so as to form a ball circulation passage with the trackway, in which the balls are respectively contacted at two points with the thread grooves when the balls are moved within the trackway; and a recess formed around the thread groove of the nut member in the vicinity of the discharge port for preventing the balls from, when the balls are discharged from the trackway in accordance with the relative axial movement between the nut member and the screw shaft, contacting with the thread grooves at three points.

Furthermore, the end cap type ball screw mechanism of the invention comprises: a screw shaft in which a thread groove is formed in an outer peripheral surface; a nut member which has in an inner peripheral surface a thread groove opposing to the thread groove of the screw shaft, and, in a thick portion, a ball return passage consisting of an axial through hole; a ball circulation member having a curved path through which the thread grooves communicate with the ball return passage, the ball circulation member being joined to end faces of the nut member; and a number of balls which can circulate with rotatingly moving in the opposing thread grooves, the ball return passage, and the curved path, the balls being respectively contacted at two points with the thread grooves, a pre-load being applied to the balls, and a recess is formed around the thread groove in the vicinity of a discharge port for the balls in the nut member, so as to immediately cancel the pre-load.

In the above-mentioned ball screw mechanism, the recess preferably has a curvature larger than a radius of the ball.

In the above-mentioned ball screw mechanism, the ball returning member may comprise:

a through hole elongating in the axial direction of the nut member; and end caps mounted to both end faces of the nut member and each having a curved path through which the through hole communicates with the trackway.

In addition, in the above-mentioned ball screw mechanism, the nut member may further comprise:

a step portion formed in the vicinity of the discharge port and disposed at a position opposite to the recess with respect to the ball.

Further, it is more preferable to modify the above-mentioned ball screw mechanism in such a manner that the ball are subjected to a pre-load between the opposed thread grooves of the screw shaft and the nut member, and the pre-load is canceled when the balls pass on the recess.

Furthermore, in the above-mentioned ball screw mechanism, the nut member may be a cylindrical member having a flat portion and two holes which formed in the flat portion so as to open and communicate with parts of the thread groove of the nut member;

the ball returning member may comprise a ball circulation tube, one end of which is communicated with the discharge port and other end of which is communicated with the inlet port; and the ball circulation tube may be fixed to the flat portion of the nut member.

According to the invention, in order to prevent the balls from, when the balls are discharged from the nut member in accordance with the relative axial movement, contacting with the thread grooves at three points, a recess is formed around the thread groove of the nut member in the vicinity of a discharge port for the balls in the nut member. When the balls are contacted with the thread grooves, therefore, a four-point contact is always maintained. Consequently, reaction forces which are applied from the thread grooves to the balls balance with each other, whereby stable holding of the balls is ensured.

DETAILED DESCRIPTION OF THE PREFERRED EMBODIMENTS

Hereinafter, embodiments of the invention will be described with reference to the drawings.

Figure 7:
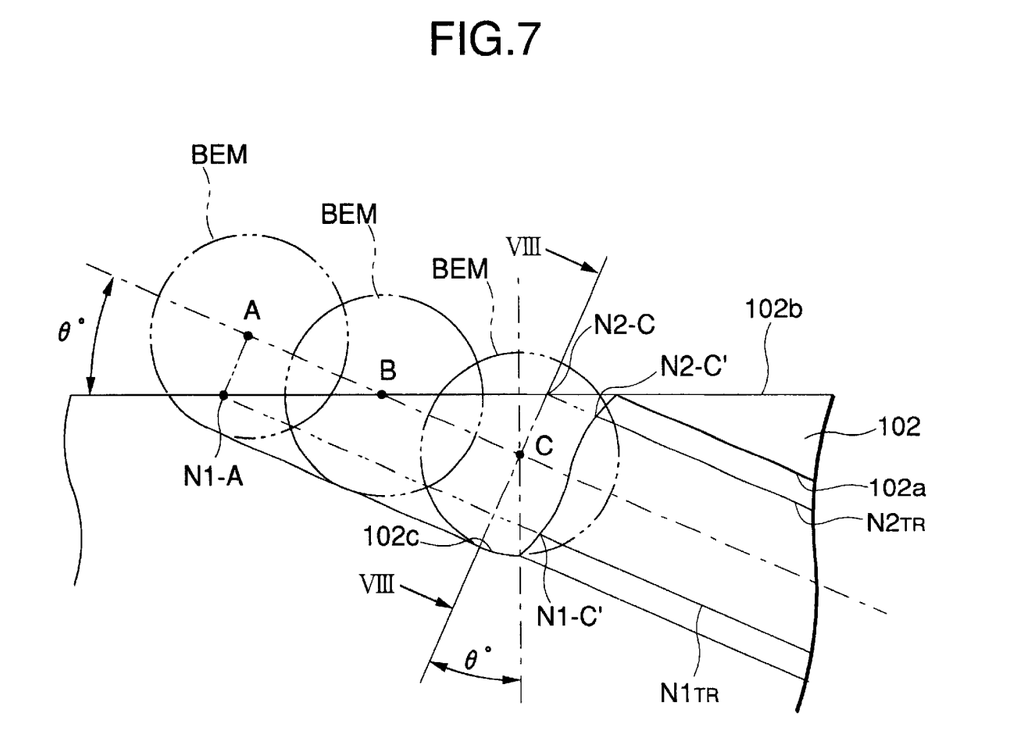
FIG. 7 is a view showing a nut 102 of an end cap type ball screw mechanism which is a first embodiment of the invention.
Figure 8:
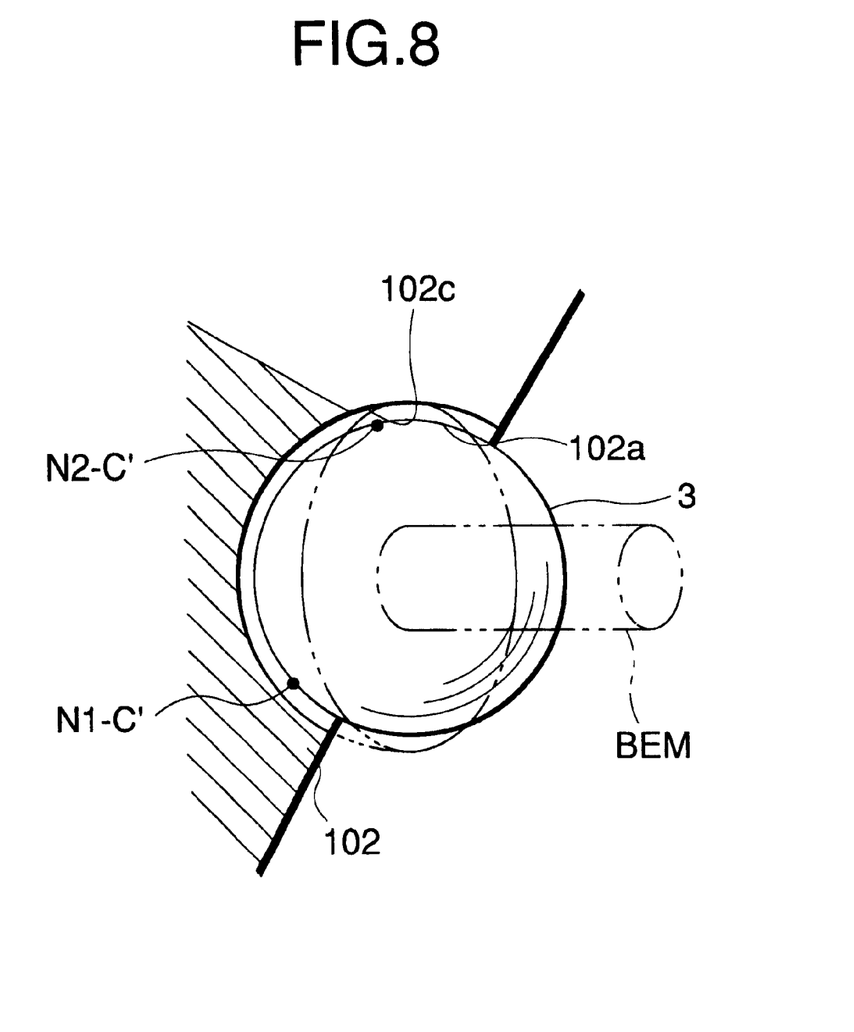
FIG. 8 is a section view of the nut 102 of FIG. 7 taken along the line VIII—VIII and as seen in the direction of the arrows.

FIG. 7 is a view similar to FIG. 4 and showing a nut 102 of an end cap type ball screw mechanism which is a first embodiment of the invention, and FIG. 8 is a section view of the nut 102 taken along the line VIII—VIII and as seen in the direction of the arrows. In both FIGS. 7 and 8, the shape of a tool (having a semispherical tip end) of a ball end mill (BEM) which is used as a cutting tool is indicated by phantom lines. FIG. 8 shows a state in which the ball 3 is placed in a thread groove 102a of the nut 102.

The nut 102 in the embodiment is different only in the shape of an end of the thread groove from the nut of the prior art. Specifically, a cutting work is conducted on the nut 102 (FIG. 3) by moving the ball end mill (BEM) along the center line (a spiral curve) of the thread groove 102a (i.e., in a direction which is inclined by the lead angle $\theta$) until the center of curvature of the tip end of the ball end mill reaches from the position A to the position C as shown in FIG. 7. As a result of the cutting work, a counterbore 102c serving as a recess is formed in the vicinity of the end of the thread groove of the nut 102. The outer diameter of the cutting edge of the ball end mill (BEM) is larger than that of the ball 3. In other words, the radius of the counterbore 102c is made larger than that of the ball.

From the view point of the working, it is preferable to set the direction in which the axis of the ball end mill (BEM) elongates, to be perpendicular to the thread groove 102a. However, the thread groove 102a is formed in the inner periphery of the cylindrical nut 102, and hence the nut 102 interferes with the cutting edge moving in the direction, thereby disabling the working. To comply with this, the tip end of the ball end mill (BEM) is obliquely inserted from both the sides of the nut 102 along the axis of the thread groove 102a, with the result that the counterbore working can be conducted without cutting an extra portion. The ball end mill (BEM) which is inserted as described above is indicated by a phantom line in FIG. 8.

As seen from FIGS. 7 and 8, the lines $N2_{TR}$ and $N1_{TR}$ which are the loci of the contact points between the ball 3 and the nut 102 are terminated at the points N2-C' and N1-C', respectively. Therefore, the separations of the ball 3 from the nut 102 at these points are simultaneously performed, so that a three-point contact of the ball 3 and the thread grooves is avoided. In other words, the pre-load is instantaneously canceled, whereby a ball rotation failure due to unbalanced reaction forces can be prevented from occurring.

In the above-described embodiment, the counterbore working is conducted by using the ball end mill so as to avoid a three-point contact of the ball and the thread grooves, thereby causing the pre-load to be instantaneously canceled. The counterbore working must be conducted over a relatively long distance. A second embodiment which will be described below can solve this problem.

Figure 9:
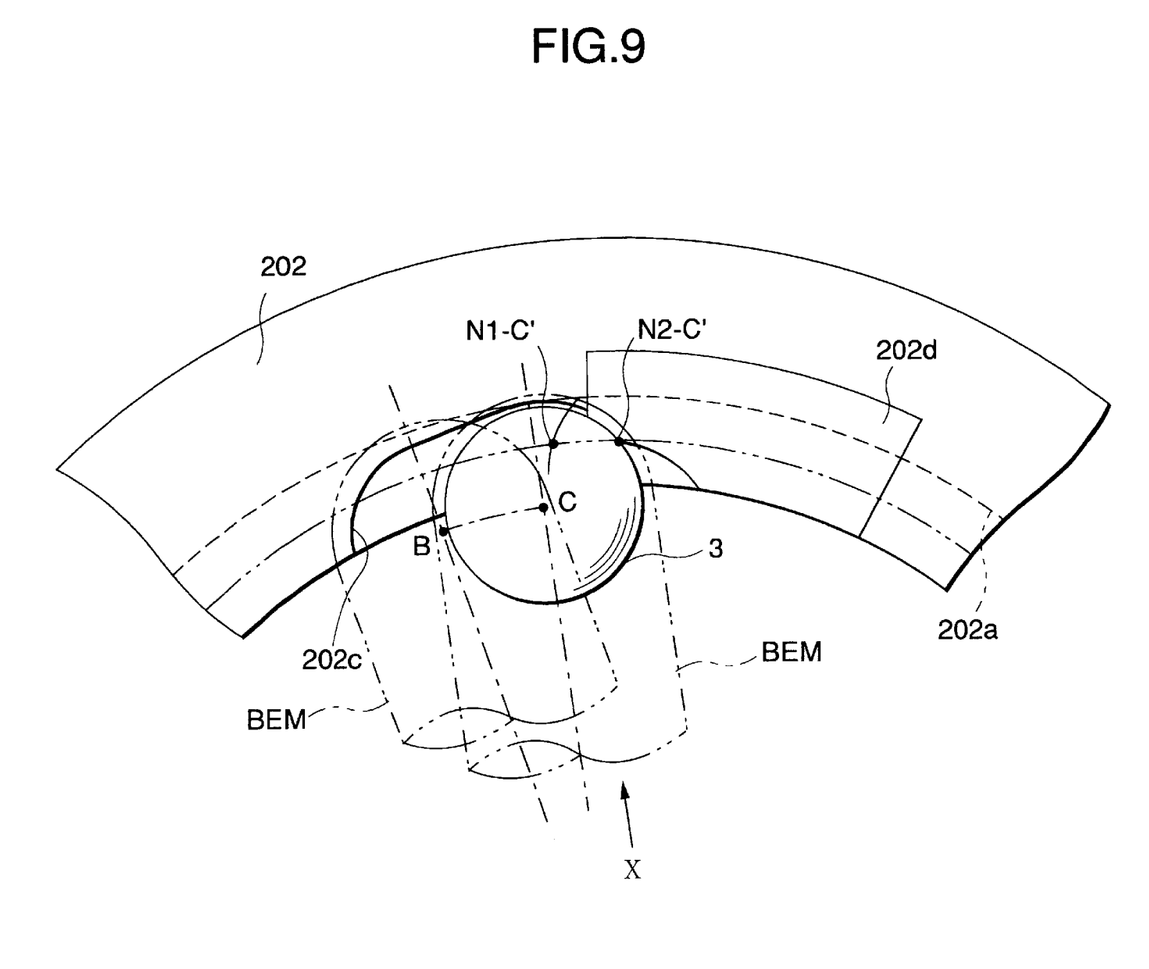
FIG. 9 is an enlarged view of an end portion of a nut 202 of an end cap type ball screw mechanism which is a second embodiment of the invention, as seen in the axial direction.
Figure 10:
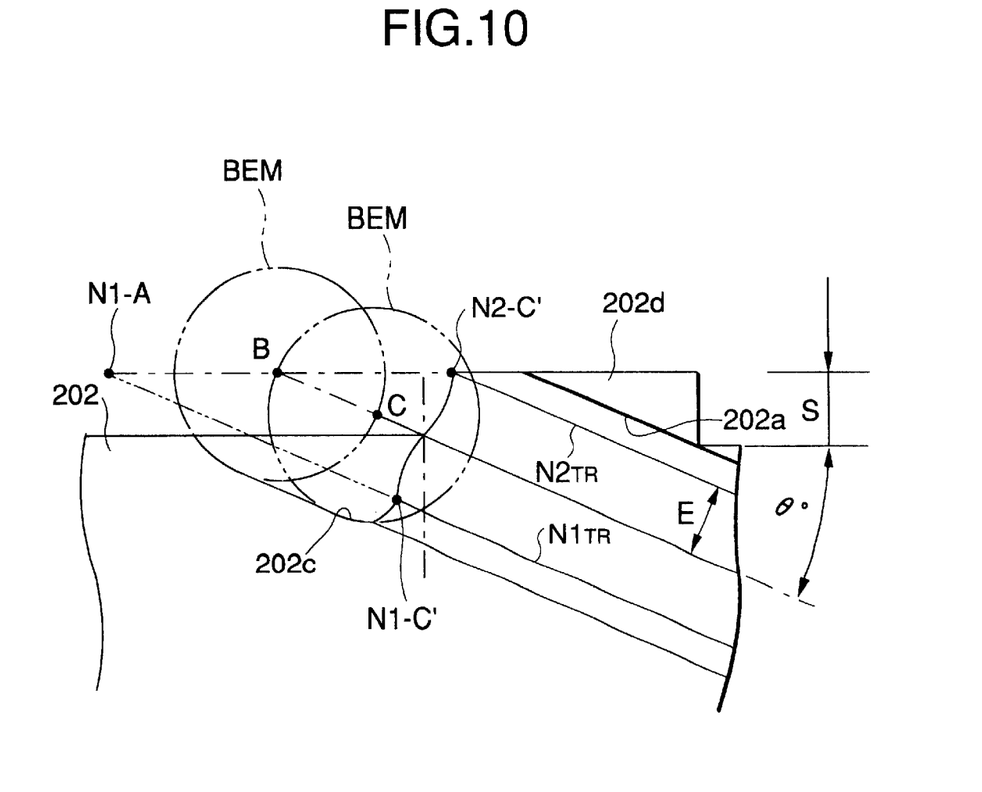
FIG. 10 is a view of the nut 202 of FIG. 9 as seen in the direction of the arrow X, in a similar manner as FIG. 9.

FIG. 9 is an enlarged view of an end portion of a nut 202 of an end cap type ball screw mechanism which is a second embodiment of the invention, as seen in the axial direction, and FIG. 10 is a view of the nut 202 of FIG. 9 as seen in the direction of the arrow X, in a similar manner as FIG. 7. In both FIGS. 9 and 10, the shape of a tool (having a semispherical tip end) of a ball end mill (BEM) which is used as a cutting tool is indicated by phantom lines. FIG. 9 also shows a state in which the ball 3 is placed in a thread groove 202a of the nut 202.

The nut 202 in the embodiment is different only in the shape of an end portion from the nut of the above-described embodiment. Specifically, as seen from FIG. 10, a step portion 202d is formed in the vicinity of an end portion of the thread groove 202a of the nut 202. Assuming that the end face of the step portion 202d of the nut 202 elongates over the whole periphery of the nut, the line $N2_{TR}$ is interrupted at the point N2-C' at the timing when the center of the ball 3 passes on a line defined by connecting a point N2-C' and N1-C' in the same manner as the mechanism of the prior art. By contrast, the line $N1_{TR}$ elongates longer than the line $N2_{TR}$ to continue to the point N1-A.

Therefore, the step portion 202d is disposed in the vicinity of the outer end (the portion where a flank is not formed in one side) of an end portion of the thread groove 202a of the nut 202, whereby the line $N2_{TR}$ is prolonged (or the line $N1_{TR}$ is relatively shortened). Furthermore, the counterbore (recess) 202c formed by a ball end mill (BEM) is disposed from the position B to the position C. This configuration can attain effects that the lines $N2_{TR}$ and $N1_{TR}$ which are the loci of the contact points between the ball 3 and the thread groove 202a of the nut 202 can be terminated at the points N2-C' and N1-C', respectively, and that it is sufficient for the counterbore formed by the ball end mill (BEM) to be disposed over a relatively short distance.

When the distance between the groove bottom of the nut 202 and the contact points N1 and N2 is indicated by E and the lead angle of the thread groove 202a is indicated by $\theta$, the height S of the step portion 202d from the end face of the nut 202 is set so as to satisfy the relationship of S≧Ecosθ.

Figure 11:
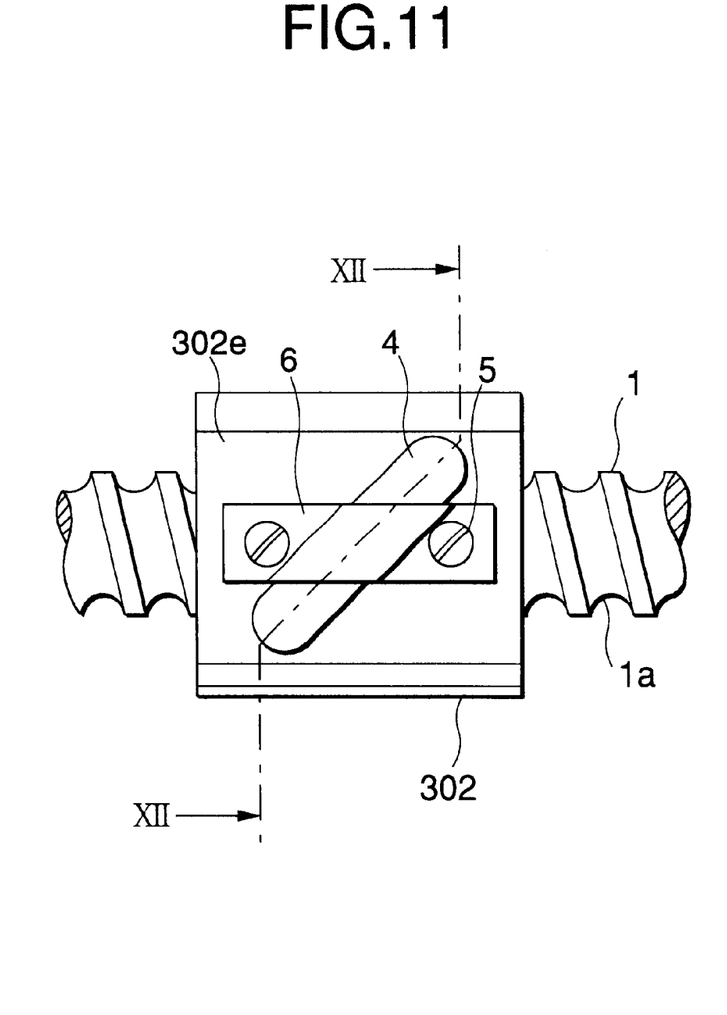
FIG. 11 is a plan view of a circulation tube type ball screw mechanism which is a third embodiment of the invention.
Figure 12:
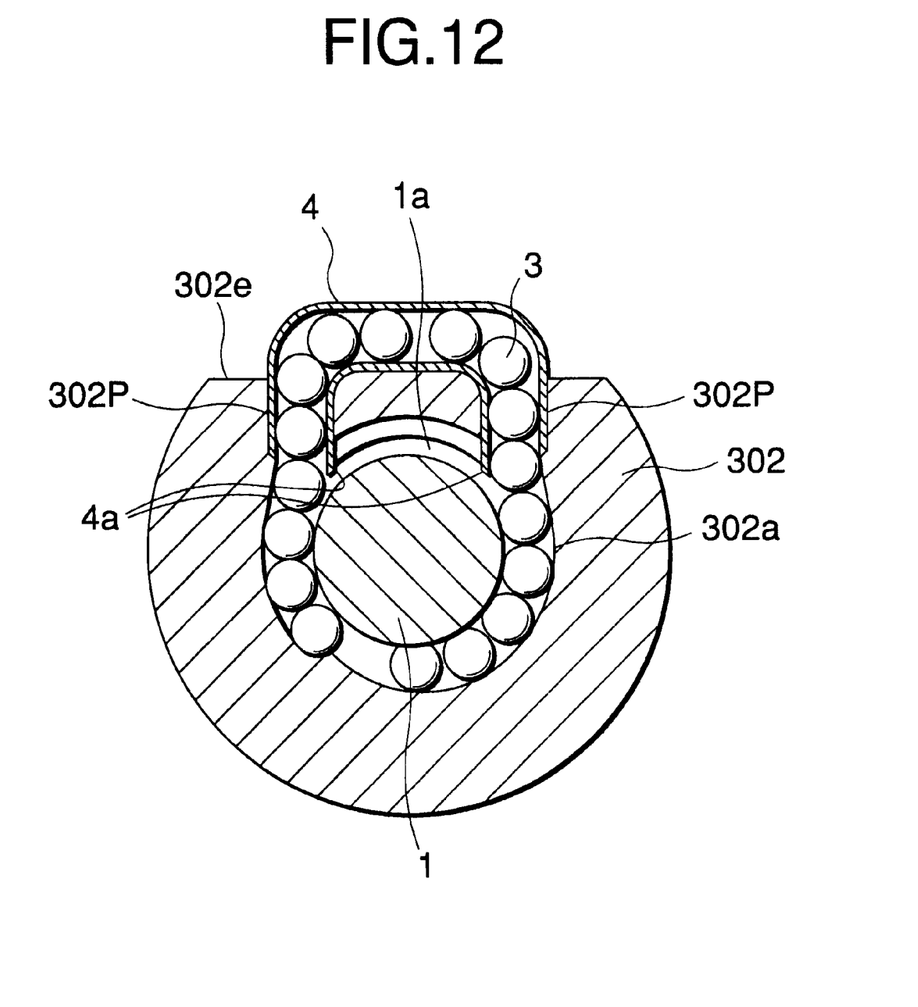
FIG. 12 is a section view of the ball screw mechanism of FIG. 11 taken along the line XII—XII and as seen in the direction of the arrows.

Next, a circulation tube type ball screw mechanism which is a third embodiment of the invention will be described with reference to the drawings. FIG. 11 is a plan view of the circulation tube type ball screw mechanism, and FIG. 12 is a section view of the ball screw mechanism of FIG. 11 taken along the line XII—XII and as seen in the direction of the arrows.

First, the configuration of the vicinity of a circulation tube of the circulation tube type ball screw mechanism will be described with reference to FIGS. 11 and 12. Referring to the figures, a screw shaft 1 is a shaft member which has in the outer face a spiral groove 1a having a Gothic arch-like section shape. A nut 302 is a cylindrical member which has in the inner face a thread groove 302a corresponding to the spiral groove 1a of the screw shaft. A flat portion 302e is formed in a part of the outer periphery, and two holes 302p are formed in the flat portion 302 so as to open and communicate with parts of the thread groove 302 1a. Ends of a U-like ball circulation tube 4 are fittingly inserted into the holes of the nut 302, respectively. The ball circulation tube 4 is fixed to the flat portion 302e of the nut 302 by set screws 5 via a mounting plate 6.

The screw shaft 1 is passed through the hole of the nut 302 so that the thread groove 1a of the shaft opposes to the spiral grooves 302a of the nut 302. A number of balls 3 are rotatably placed in a ball circulation path configured by the ball circulation tube 4, and also in the thread grooves between the ends of the ball circulation path. The balls 3 are closely fitted into the thread groove 302a of the nut 302 and the spiral groove 1a of the screw shaft 1. The nut 302 and the screw shaft 1 are enabled to perform relative spiral movement in the axial direction by rotation of the balls 3. The relative spiral movement of the nut 302 and the screw shaft 1 causes the balls 3 to repeat circulation in which the balls rotatingly move along the spiral grooves 1a and 302a, are scooped up from the spiral grooves 1a and 302a while being guided by a tongue portion 4a formed at an end portion of the ball circulation tube 4, to be directed into the ball circulation tube 4, pass through the tube, and then return to the spiral grooves 1a and 302a via the other end of the tube.

Figure 13:
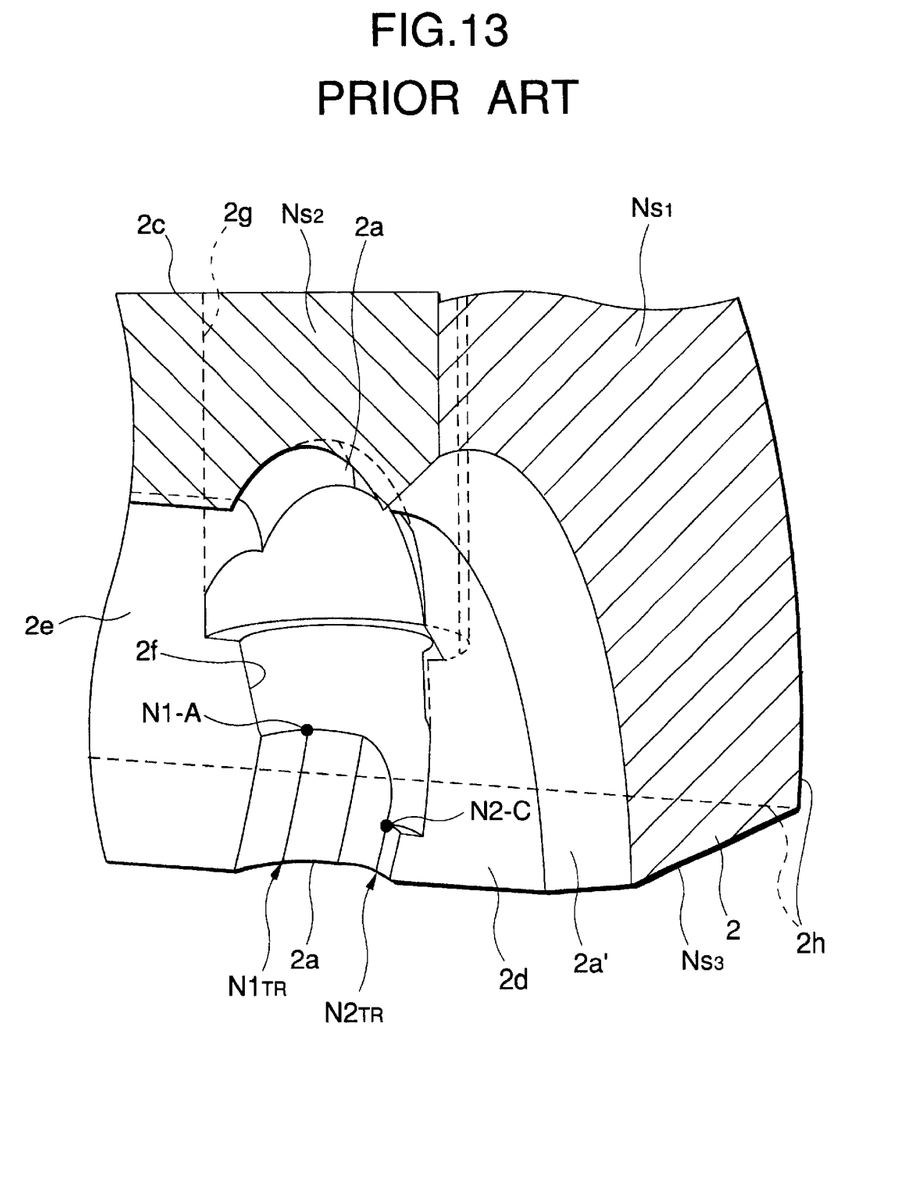
FIG. 13 is a three-dimensional imaginary view showing the vicinity of a thread groove of a nut 2 in a circulation tube type ball screw mechanism of the prior art as shown in FIG. 1.

FIG. 13 is a three-dimensional imaginary view showing the vicinity of the thread groove of the nut 2 in the circulation tube type ball screw mechanism of the prior art as shown in FIG. 1. In addition, in FIG. 13, Ns1 indicates a sectional surface defined by cutting the nut 2 along with a plane containing a line perpendicular to the rotational axis of the nut 2, Ns2 denotes a sectional surface defined by cutting the nut along with a vertical plane, Ns3 designates a sectional surface defined by cutting the nut 2 along with a horizontal plane, 2h indicates a part of the outer periphery of the nut 2, and 2a' denotes a part of the adjacent thread groove 2a.

Note that in order to facilitate the understanding of the internal shape of the nut, FIG. 13 and FIG. 14, however, which will be described later show the thread groove and so on as seen from the outside with making the other components transparent, and do not show the shape which is actually seen.

In the thus configured nut 2, the holes for mounting the circulation tube are formed in the following manner. First, a cylindrical hole 2f elongating from the upper face 2c to the thread groove 2a is vertically formed by a cutting process using an end mill (not shown) having a cylindrical tip end. Thereafter, a mounting hole 2g is formed around the cylindrical hole 2f. Alternatively, the mounting hole 2g may be first formed and the cylindrical hole 2f may be then formed.

In a ball screw mechanism using the thus configured nut of the prior art, the line $N2_{TR}$ is interrupted at the point N2-C, but the line $N1_{TR}$ elongates to continue to the point N1-A. Namely, in such a configuration, a problem of the three-point contact between a ball and thread grooves is produced and a ball rotation failure may occur.

Figure 14:
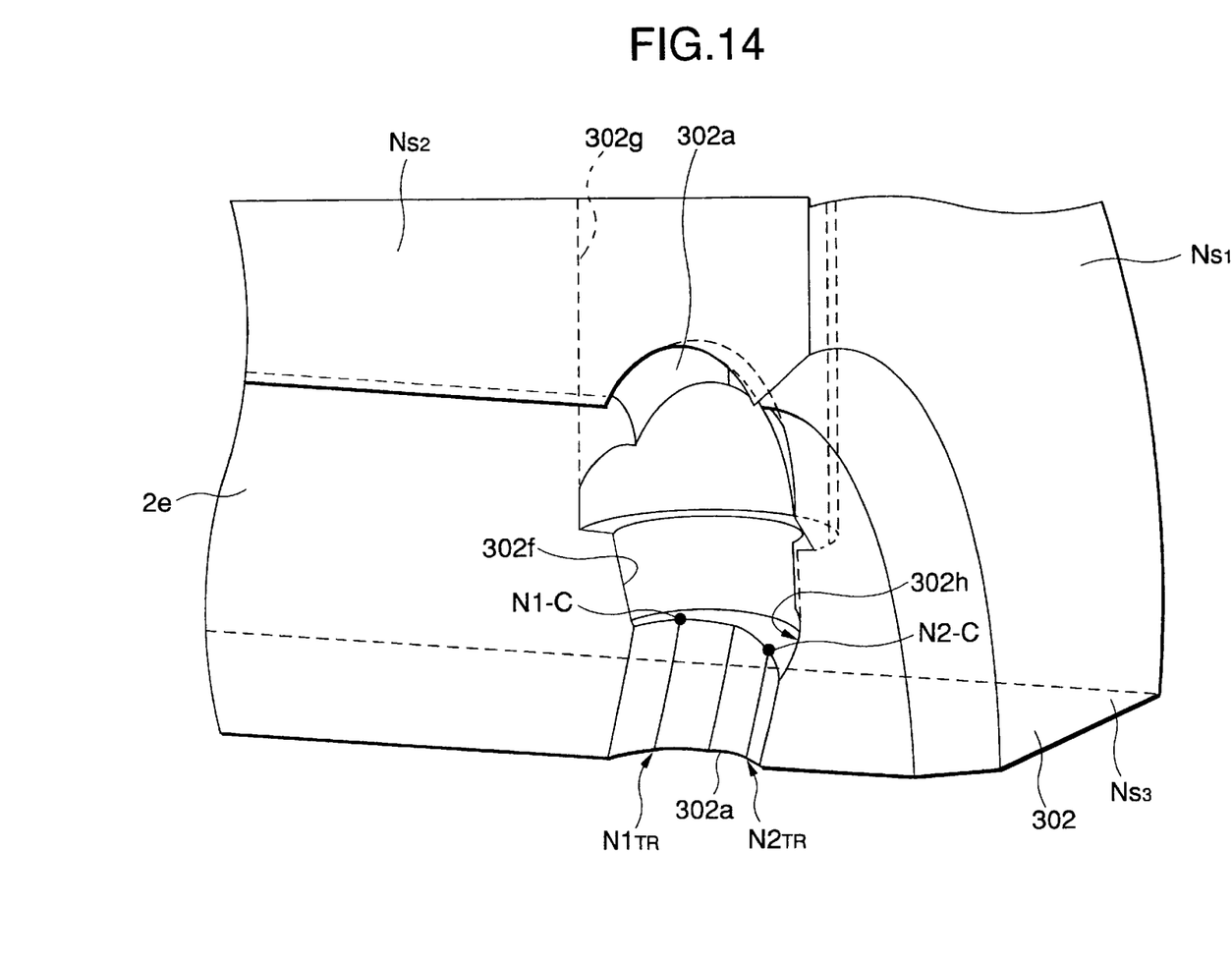
FIG. 14 is a three-dimensional imaginary view similar to FIG. 13 and showing a nut 302 in a circulation tube type ball screw mechanism which is a third embodiment of the invention.

FIG. 14 is a three-dimensional imaginary view similar to FIG. 13 and showing the nut 302 in the circulation tube type ball screw mechanism which is the third embodiment of the invention. In the thus configured nut 302, the holes for mounting the circulation tube are formed in the following manner. First, a cylindrical hole 302f elongating from the upper face to the thread groove 302a and having a semispherical recess 302h at the lower end is vertically formed by a cutting process using a ball end mill (not shown) having a semispherical tip end the diameter of which is larger than the outer diameter of the ball. Thereafter, a mounting hole 302g is formed around the cylindrical hole 302f. Alternatively, the mounting hole 302g may be first formed and the cylindrical hole 302f may be then formed.

As apparent from FIG. 14, since the semispherical recess 302h is formed, the lines $N2_{TR}$ and $N1_{TR}$ which are the loci of the contact points between the ball (not shown) and the nut 302 are terminated at the points N2-C and N1-C, respectively. Therefore, the separations of the ball from these points of the nut 302 are simultaneously performed, so that a three-point contact of the ball and the thread grooves is avoided. Therefore, a ball rotation failure due to unbalanced reaction forces can be prevented from occurring.

Although the invention has been described by means of its embodiments, it should be understood that the invention is not restricted to these embodiments and can be adequately modified or improved. In the embodiments, for example, the recess is formed by a counterbore forming process using a ball end mill. Irrespective of the working method, the effects of the invention can be attained as far as the recess is formed.

According to the invention, in order to prevent balls from, when the balls are discharged from a nut member in accordance with relative axial movement of a nut member and a screw shaft, contacting with thread grooves of the nut member and the screw shaft at three points, a recess is formed around the thread groove of the nut member in the vicinity of a discharge port for the balls in the nut member. When the balls are contacted with the thread grooves, therefore, a four-point contact is always maintained. Consequently, reaction forces which are applied from the thread grooves to the balls balance with each other, whereby stable holding of the balls is ensured.

In the end cap type ball screw mechanism of the invention, since the pre-load is immediately canceled in the vicinity of the ball discharge port in the nut member, a stable operation which is free from biting of the balls into the thread grooves can be obtained.

What is claimed is:

1. A ball screw mechanism comprising:
   a screw shaft having a thread groove formed on its outer peripheral surface;
   a nut member movable relative to said screw shaft in an axial direction thereof and having a thread groove which is formed on its inner peripheral surface and is opposed to said thread groove of said screw shaft;
   a number of balls rotatingly movable along a trackway formed by said opposed thread grooves of said screw shaft and said nut member;

a ball returning member for returning said balls discharged from a discharge port of said trackway to an inlet port of said trackway so as to form a ball circulation passage with said trackway, in which said balls are respectively contacted at two points with each of said thread grooves when said balls arc moved within said trackway; and a recess formed around said thread groove of said nut member, said recess defining a release point of said balls such that the nut contact points release simultaneously which prevents said balls from contacting with said thread grooves at three points when said balls are discharged from said trackway in accordance with the relative axial movement between said nut member and said screw shaft.

2. The ball screw mechanism according to claim 1, in which said recess has a curvature larger than a radius of said ball.

3. The ball screw mechanism according to claim 1, in which said ball returning member comprises:

a through hole elongating in the axial direction of said nut member; and end caps mounted to both end faces of said nut member and each having a curved path through which said through hole communicates with said trackway.

4. The ball screw mechanism according to claim 1, in which said nut member is a cylindrical member having a flat portion and two holes which are formed in said flat portion so as to open and communicate with parts of said thread groove of said nut member;

said ball returning member comprises a ball circulation tube, one end of which is communicated with said discharge port and another end of which is communicated with said inlet port; and said ball circulation tube is fixed to said flat portion of said nut member.

5. A ball screw mechanism comprising:

a screw shaft having a thread groove formed on its outer peripheral surface;

a nut member movable relative to said screw shaft in an axial direction thereof and having a thread groove which is formed on its inner peripheral surface and is opposed to said thread groove of said screw shaft;

a number of balls rotatingly movable along a trackway formed by said opposed thread grooves of said screw shaft and said nut member;

a ball returing member for returning said balls discharged from a discharing port of said trackway to an inlet port of said trackway so as to form a ball circulation passage with said trackway, in which said balls are respectively contacted at two points with said thread grooves when said balls are moved within said trackway; and a recess formed around said thread groove of said nut member in the vicinity of said discharge port for preventing said balls from contacting with said thread grooves at three points when said balls are discharged from said trackway in accordance with the relative axial movement between said nut member and said screw shaft, in which said ball returning member comprises:

a through hole elongating in the axial direction of said nut member; and end caps mounted to both end faces of said nut member and each having a curved path through which said through hole communicates with said trackway, and in which said nut member further comprises:

a step portion formed in the vicinity of said discharge port and disposed at a position opposite to said recess with respect to said ball.

6. A ball screw mechanism comprising:

a screw shaft having a thread groove formed on its outer peripheral surface;

a nut member movable relative to said screw shaft in an axial direction thereof and having a thread groove which is formed on its inner peripheral surface and is opposed to said thread groove of said screw shaft;

a number of balls rotatingly movable along a trackway formed by said opposed thread grooves of said screw shaft and said nut member;

a ball returning member for returning, said balls discharged from a discharge port of said trackway to an inlet port of said trackway so as to form a ball circulation passage with said trackway, in which said balls are respectively contacted at two points with said thread grooves when said balls are moved within said trackway; and a recess formed around said thread groove of said nut member in the vicinity of said discharge port for preventing said balls from contacting with said thread grooves at three points when said balls are discharged from said trackway in accordance with the relative axial movement between said nut member and said screw shaft in which said ball returning member comprises:

a through hole elongating in the axial direction of said nut member; and end caps mounted to both end faces of said nut member and each having a curved path through which said through hole communicates with said trackway, and in which said balls are subjected to a pre-load between said opposed thread grooves of said screw shaft and said nut member, and said pre-load is canceled when said balls pass said recess.

7. An end cap type ball screw mechanism comprising:

a screw shaft in which a thread groove is formed in an outer peripheral surface;

a nut member which has an inner peripheral surface with a thread groove opposing said thread groove of said screw shaft, and said nut member also having a thick portion which includes a ball return passage comprising an axial through hole;

a ball circulation member having a curved path through which said thread grooves communicate with said ball return passage, said ball circulation member being joined to end faces of said nut member; and a number of balls which can circulate with rotational movement in said opposing thread grooves, said ball return passage, and said curved path, said balls being respectively contacted at two points with said thread grooves, a pre-load being applied to said balls, wherein a recess is formed around said thread groove of said nut member in the vicinity of a discharge port for said balls, so as to immediately cancel the pre-load.

* * * * *